United States Patent

[11] 3,605,028

| | | |
|---|---|---|
| [72] | Inventor | Jakob de Vries<br>Allenwinden, Switzerland |
| [21] | Appl. No. | 6,202 |
| [22] | Filed | Jan. 27, 1970 |
| [45] | Patented | Sept. 14, 1971 |
| [73] | Assignee | Landis & Gyr, A.G.<br>Zug, Switzerland |
| [32] | Priority | Jan. 30, 1969 |
| [33] | | Switzerland |
| [31] | | 1402/69 |

[54] CIRCUIT ARRANGEMENT FOR THE MULTIPLICATION OF TWO VARIABLES
10 Claims, 3 Drawing Figs.

[52] U.S. Cl. .................................................. 328/160,
235/194, 307/229, G06g/7/16
[50] Field of Search .......................................... 328/160;
235/194; 307/229

[56] References Cited
UNITED STATES PATENTS

| 3,466,460 | 9/1969 | Connolly | 328/160 X |
| 3,486,122 | 12/1969 | Clapp | 328/160 |

Primary Examiner—Donald D. Forrer
Assistant Examiner—B. P. Davis
Attorney—Morgan, Finnegan, Durham & Pine ABSTRACT: The invention relates to a circuit arrangement for multiplying two values, particularly for forming the product of current and voltage, in order to measure real output, comprising a current frequency changer, which generates a sequence of output pulses at a pulse sequence frequency proportional to the product and which has an operational amplifier, the input of which is coupled to the output via a capacitor, a pulse produced by a current generator being supplied to the operational amplifier when a threshold switch downstream of the latter responds.

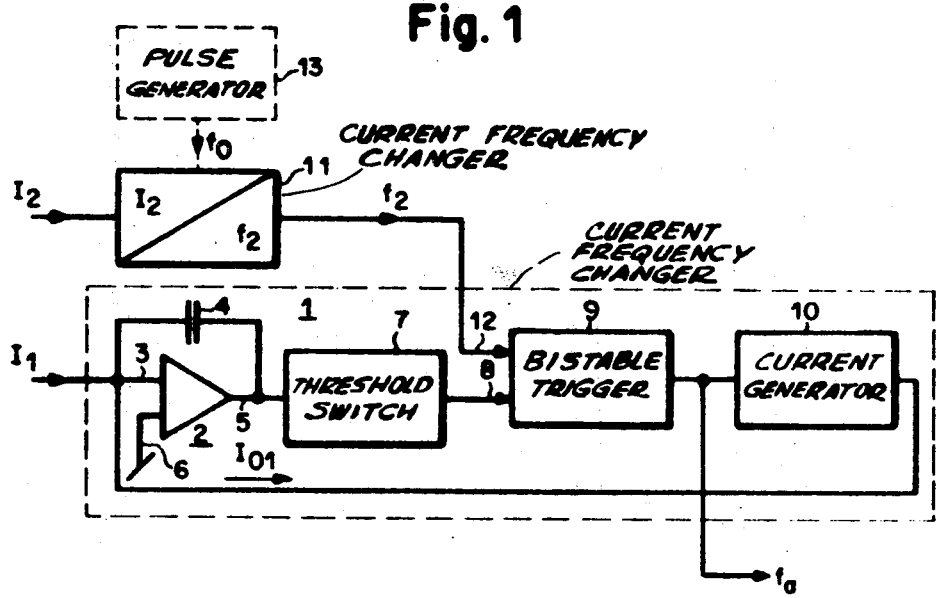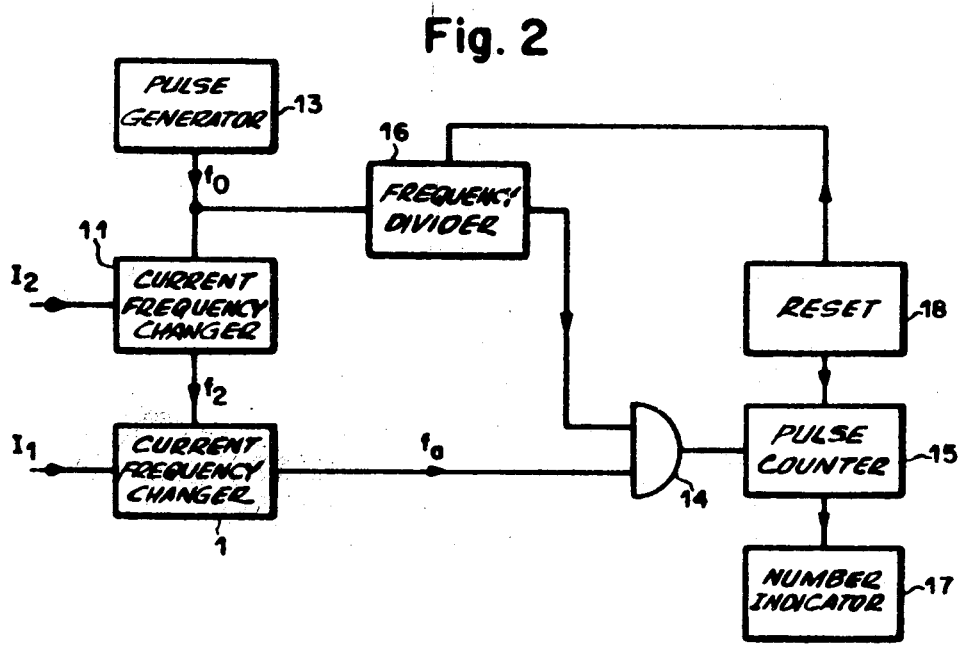

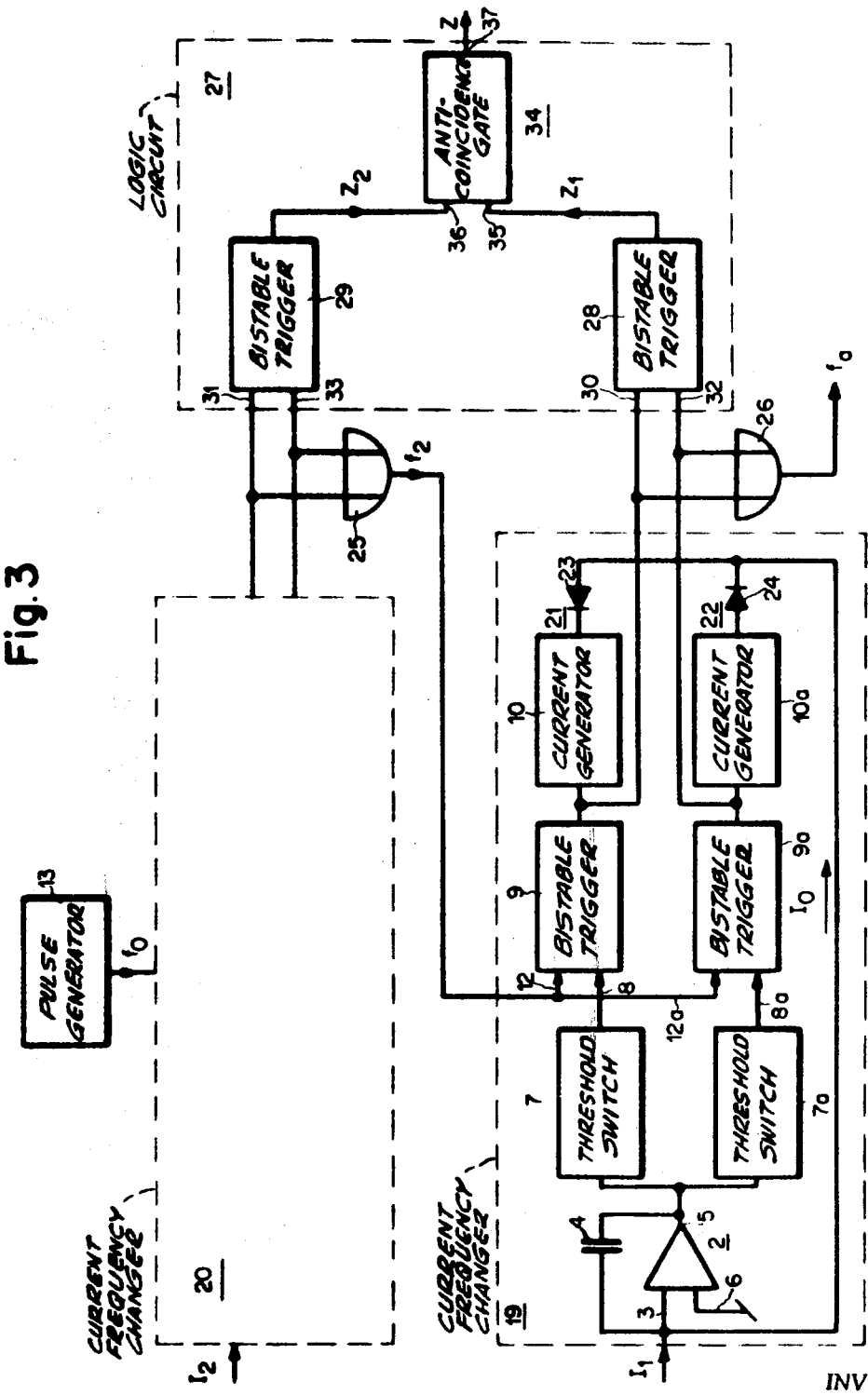

CIRCUIT ARRANGEMENT FOR THE MULTIPLICATION OF TWO VARIABLES

BACKGROUND AND OBJECTS OF THE INVENTION

It is known that the product of voltage and current must be formed in order to measure true electrical output. Both mechanical apparatus and purely electronic arrangements are known for multiplying two values, although the latter usually have components with inconstant, e.g., temperature-dependent characteristic curves, which have an adverse effect on the accuracy of the measurement. This applies, or example, when Hall generators are used and when the product $xy$ is formed from the equation log $xy$=log $x$+log $y$, where logarithmic curves of semiconductor elements are used. In order to determine the product $xy$ from the equation $4xy = (x+y)^2 - (x-y)^2$ quadratic curves of semiconductor arrangements are required.

In another known multiplying circuit the amplitude of the pulses in a sequence is modulated in dependence on one factor and the pulse duration to interval duration ratio in dependence on the other factor, so that the mean voltage value of the pulses is proportional to the product. This circuit has proved successful in practice but cannot readily be made in a monolithically integrated form. Moreover, the known circuit for multiplying values with a variable plus or minus sign requires rapid transistorized reversing switches, and the residual voltages or residual resistances of these may seriously falsify the result.

The known multipliers mentioned above first form the product in analogue form. But what is required to ascertain the electrical energy is not an analogue measurement but a pulse sequence with a frequency proportional to the product of voltage and current. A current frequency changer, therefore, has to be interpolated at the output of known multipliers, and this may lead to additional errors in measurement.

The invention aims to provide a circuit arrangement for multiplying two values; it must be free from the drawbacks of known arrangements and must directly produce a pulse sequence of a frequency proportional to the product of the values to be multiplied.

The invention is characterized in that a current proportional to the first multiplication value is supplied to the current frequency changer and a current proportional to the second multiplication value is supplied to the second current frequency changer, and that the current generator is always switched on during at least one period of the pulse sequence generated by the second changer, following the response of the threshold switch.

Ways in which the invention is applied and may be modified are suggested in the following examples. These refer to the accompanying drawings, in which:

FIG. 1 is a theoretical circuit diagram, and
FIGS. 2 and 3 are modifications thereof.

In FIG. 1, 1 refers to a first current frequency changer which generates a pulse sequence of a sequence frequency $f_a$ proportional to the input current $I_1$. The frequency changer has an operational amplifier 2 at the input side, in which the input 3 is coupled to the output 5 via a capacitor 4 and in which zero potential is applied to the earth connection 6. A threshold switch 7 downstream of the operational amplifier 2 is connected to a preparatory input 8 of a bistable trigger or flip-flop circuit 9, which controls the current generator 10. The control is exerted in such a way that, when the trigger circuit 9 is triggered, the generator 10 is switched on and —according to the polarity chosen for the circuit —either supplies a constant current $I_{01}$ to or withdraws it from the operational amplifier 2, which acts as a Miller integrator.

A second current frequency changer 11, the technical details of which are not shown in FIG. 1, generates a pulse sequence of a frequency $f_2$ proportional to the input current $I_2$. This sequence is fed to a trigger input 12 of the bistable trigger circuit 9.

The mode of operation of the amplifier 2 can be taken as known. The input current $I_1$ charges the capacitor 4, and the voltage at the output 5 increases negatively and linearly. The threshold switch 7 has not at first responded, and a blocking signal is applied to the preparatory input 8, preventing the bistable trigger circuit 9 from responding to the pulses emitted by the current frequency changer 11. As soon as the voltage at the output 5 reaches the threshold value of the switch 7, the latter responds and the trigger circuit 9 is released. When the next pulse reaches the trigger input 12, the circuit 9 triggers and the current generator 10 withdraws a constant current $I_{01}$ from the capacitor 4. The discharging of the capacitor 4 makes the threshold switch 7 revert to the original condition. When the next pulse is emitted by the current frequency changer 11 the trigger circuit 9 also moves back to its original state. The process is repeated periodically.

Thus the current generator 10 is always switched on during the next period $T_2=1/f_2$ of the pulse sequence generated by the current frequency changer 11, following the responding of the threshold switch 7. If we first disregard the fact that the current pulses sent to the input 3 lag behind the responding time of the threshold switch 7 by a time which fluctuates statistically between the limits of zero and $T_2=1/f_2$, then the pulse sequence frequency $f_a$ is subject to the known equation $$f_a = \frac{I_1}{T_2 \cdot I_{01}}$$

If $f_2=1/T_2=k \cdot I_2$, $k$ being a constant, it follows that $$f_a = \frac{k}{I_{01}} \cdot I_1 \cdot I_2$$

Hence the pulse sequence frequency $f_a$ is proportional to the product $I_1 \cdot I_2$.

As a result of the statistically fluctuating delay of the current pulses transmitted to the input 3, the pulse sequence frequency $f_a$ fluctuates about a constant mean value, where $I_1$ and $I_2$ are constant magnitudes. The smaller the fluctuations, the better the condition $T_1 >> T_2$ is fulfilled, $T_1=1/f_a$ representing the period of the output pulses emitted by the current frequency changer 1. If the output frequency $f_a$ is to be measured directly over a relatively short time, the condition $T_1 > T_2$ must be fulfilled. In most applications, however, only the mean time value of the output frequency $f_a$ considered over a longer period, is evaluated. This is the case, for example, when measuring electrical energy electronically, where the output frequency $f_a$ is proportional to the electrical power consumed and the energy is determined by counting the output pulses. In systems of this type statistical fluctuations of the output frequency $f_a$ may be disregarded without losing an adequate degree of accuracy, so that the only requirement to be fulfilled is that $$T_2 < \frac{1}{f_{max}}$$

wherein $f_{max}$ represents the maximum value of the output frequency $f_a$.

Instead of the bistable trigger circuit 9, a counting arrangement may be interpolated; this may control the current generator 10 in such a way that the latter is switched on during a preselected number $n$ of successive periods $T_2$ of the pulse sequence generated by the current frequency changer 11, after the threshold switch 7 has responded. In this case, the width of the current pulses emitted by the generator 10 is $n$-times as great as the maximum possible delay of the pulses.

The current frequency changer 11 may be constructed electrically in the same way as the changer 1, if the trigger input of the bistable trigger circuit of the changer 11 is connected -as indicated in broken lines in FIG. 1 -to a pulse generator 13 which produces a reference pulse sequence with a frequency $f_0$ and a period $T_0=1/f_0$. The following equations then apply:

$$f_2 = f_0 \cdot \frac{I_2}{I_{02}}$$

and $$f_a = f_2 \cdot \frac{I_1}{I_{01}} = \frac{f_0}{I_{01} \cdot I_{02}} \cdot I_1 \cdot I_2,$$

$I_{02}$ being the current of the generator of the current frequency changer 11.

The arrangement shown diagrammatically in FIG. 2 is for ascertaining the product $I_1 \cdot I_2$ digitally. Components which are identical with those in FIG. 1 carry the same references. The output of the current frequency changer 1 is taken to a pulse counter 15 via a gate circuit 14. A frequency divider 16 connected to the pulse generator 13 controls the gate circuit 14, in such a way that the circuit is open during a predetermined number $m$ of successive periods $T_0$. The output pulses of the changer 1 are counted into the counter 15 during the time $T_m = m \cdot T_0 = m/f_0$. The number of pulses $N = T_m \cdot f_a$ counted during this time is shown in a number indicator 17. A resetting arrangement 18 periodically sets the pulse counter 15 and frequency divider 16 to zero.

$$N = T_m \cdot f_a = \frac{m}{f_0} \cdot \frac{f_0}{I_{01} \cdot I_{02}} \cdot I_1 \cdot I_2 = \frac{m}{I_{01} \cdot I_{02}} \cdot I_1 \cdot I_2$$

Hence, the number $N$ of pulses counted into the counter 15 is proportional to the product $I_1 \cdot I_2$. The proportionality factor $m/I_{01} \cdot {}^{a-1/2}_{02}$ is independent of the reference frequency $f_0$. This means however, that the reference frequency $f_0$ can be allowed to fluctuate within broad limits. A free-running oscillator can therefore be used as the pulse generator 13.

FIG. 3 shows a theoretical diagram of a circuit arrangement for multiplying magnitudes which may assume both positive and negative values. The input currents $I_1$ and $I_2$ are each fed to a current frequency changer 19 and 20 respectively, of identical construction. For the sake of simplicity, details are only shown in the changer 19, which is no different from the changer 1 in FIG. 1 as far as components 2 to 10 are concerned. A channel 22 consisting of elements 7a, 9a and 10a is interpolated between the output 5 and the input 3 of the operational amplifier 2, in addition to the channel, 21 made up of elements 7, 9 and 10. The threshold of the switch 7 is negative and that of the switch 7a positive. The current generators 10 and 10a are of opposite polarity, so that the compensating current $I_0$ is negative with a negative input current. Diodes 23 and 24 prevent the generators 10 and 10a from affecting one another.

The pulse generator 13 is connected to the trigger inputs 12 and 12a of the bistable trigger circuits 9 and 9a of the current frequency changer 20. The outputs of the circuits 9 and 9a of this changer are coupled via an OR- gate 25 to the trigger inputs 12 and 12a of the current frequency changer 19. The outputs of the circuits 9 and 9a of the changer 19 are taken to an OR- gate 26.

The outputs of the bistable trigger circuits 9 and 9a of the changers 19 and 20 are connected to a logic circuit 27, consisting of bistable trigger circuits 28 and 29, each with a setting input 30 and 31 respectively and a resetting input 32 and 33 respectively, and of an anticoincidence gate 34 with inputs 35 and 36 and an output 37.

The arrangement described operates as follows:

With a positive input current $I_1$ or $I_2$ a channel 21 of the changer 19 or 20 0and with a negative input current the channel 22 responds. At the output of the OR- gate 25 there forms a pulse sequence with a frequency $f_2$ proportional to the absolute value of the current $I_2$. The pulse sequence frequency $f_a$ at the output of the OR- gate 26 is proportional to the absolute value of the product $I_1 \cdot I_2$. The positive or negative sign signal $Z_1$ at the output of the bistable trigger circuit 28 equals "L" if $I_1 > 0$ and equals "0" if $I_1 < 0$. The same applies to the sign signal $Z_2$ at the output of the bistable trigger circuit 29. The sign signal $Z$ at the output 37 of the anticoincidence gate 34, which fulfills the equation $z = Z_1 Z_2 + \bar{Z}_1 \bar{Z}_2$, thus equals "L" if the product of $I_1 \cdot I_2$ is positive and "0" if it is negative.

The values $I_1$ and $I_2$ may be alternating currents, provided that the pulse sequence frequencies $f_h$, $f_2$ and $f_a$ are large as compared with the frequencies of the currents $I_1$ and $I_2$.

The real output of an electricity-consuming device can be measured with the arrangement described, if the current $I_1$ is chosen, for example, so as to be proportional to the voltage and the current $I_2$ proportional to the current of the device. In order to measure the electrical energy consumed, the output pulse sequence of the arrangement may be fed to a forward and backward counter, in which the counting direction is controlled by the sign signal $z$.

What is claimed is:

1. A circuit for multiplying two values so as to obtain their product comprising:
    a. an operational amplifier having an input and an output wherein said input is coupled to said output via a capacitor and said input has applied to it a signal proportional to said first value to be multiplied;
    b. a threshold switching means electrically coupled to the output of said amplifier, said threshold switching means being actuated so as to pass said signal whenever the voltage at the output of said amplifier reaches a predetermined value;
    c. a current frequency changer capable of generating an output pulse whose frequency is proportional to said second value to be multiplied;
    d. a bistable trigger means electrically coupled to both outputs of said threshold switch and said current frequency changer, said bistable trigger means being triggered upon the simultaneous application to it of said output from said current frequency changer and said signal passed by said threshold switching means; and
    e. a current generator coupled between the input of said operational amplifier and the output of said bistable trigger, said current generator being actuated during at least one period of the pulse sequence generated by said current frequency changer following the actuation of said threshold switch so as to have flow between said bistable trigger and said current generator a signal whose signal sequence frequency is proportional to the product of said two values.

2. A circuit for multiplying two values so as to obtain their product as described in claim 1 wherein one of said values is representative of current and the other of said values is representative of voltage.

3. A circuit for multiplying two values so as to obtain their product as described in claim 1 wherein said current frequency changer comprises a second operational amplifier having an input and an output wherein said input is coupled to said output via a capacitor, a second threshold switching means whose input is electrically coupled to the output of said second operational amplifier and is actuated whenever the voltage at the output of said second amplifier reaches a predetermined value and a second bistable trigger means whose inputs are electrically coupled to the output of said second threshold switch and to the output of a second pulse generator, said second bistable trigger means being triggered upon the simultaneous application to it of said output from said second pulse generator and said signal passed by said second threshold switching means.

4. A circuit for multiplying two values so as to obtain their product as described in claim 3 further characterized by having the signal that flows between said bistable trigger and said current generator coupled to a gate circuit, said gate circuit being open during a predetermined number of periods of said second pulse generator.

5. In a multiplying circuit for obtaining the product of two values, utilizing a first current frequency changer that generates a sequence of output pulses whose frequency is proportional to the product of said two values, said first current frequency changer comprising:
    an operational amplifier, the input of which is coupled via a capacitor to the output of said amplifier, and
    a current generator whose output is fed to said amplifier when a threshold switch and a bistable trigger both of which are serially coupled between said amplifier and said current generator are actuated;

said circuit further characterized in that a current proportional to the first multiplication value is fed to said first current frequency changer and a current proportional to the second multiplication value is fed to a second current frequency changer the output from said second current frequency changer being coupled to said bistable trigger of said first current frequency changer so as to have said current generator switched on during at least one period of the pulse sequence generated by said second current frequency changer following the responding of said threshold switch.

6. The multiplying circuit described in claim 5 wherein said second current frequency changer is identical to that of said first current frequency changer and the input of the bistable trigger circuit of said second current frequency changer is coupled to a pulse generator.

7. The multiplying circuit as described in claim 6 wherein the output of said first current frequency changer is coupled to a pulse counter via a gate circuit, said gate circuit being opened during a predetermined number of periods of said pulse generator.

8. The multiplying circuit as described in claim 7 wherein said first and second current frequency changers each have a pair of threshold switches, each of said pairs having a positive threshold switch and a negative threshold switch, each of said switches in turn being coupled to its own bistable trigger and current generator, said current generator being coupled between said amplifier and said bistable triggers so that said current generators are capable of generating a signal whose polarity corresponds to the polarity of the threshold switch from which said current generator draws.

9. The multiplying circuit as described in claim 8 wherein the outputs of said bistable triggers are coupled to logic circuitry which switches into one logic state when the product of said values to be multiplied is positive and into another logic state when said product is negative.

10. The multiplying circuit as described in claim 9 wherein said logic circuitry includes two bistable trigger circuits the outputs of which are connected to inputs of an anticoincidence gate.